United States Patent [19]

Faust et al.

[11] Patent Number: 5,428,111
[45] Date of Patent: Jun. 27, 1995

[54] LIVING POLYMERIZATION OF OLEFINS TO PRODUCE COPOLYMER

[75] Inventors: Rudolph Faust, Lexington, Mass.; Zsolt Fodor, Budapest, Hungary

[73] Assignee: University of Massachusetts, Lowell, Mass.

[21] Appl. No.: 137,659

[22] Filed: Oct. 15, 1993

[51] Int. Cl.⁶ ............... C08F 293/00; C08F 297/00; C08F 10/10
[52] U.S. Cl. .................... 525/314; 525/319; 525/245
[58] Field of Search ............ 525/314, 319, 245

[56] References Cited

U.S. PATENT DOCUMENTS

| | | | |
|---|---|---|---|
| 4,276,394 | 6/1981 | Kennedy et al. | 525/245 |
| 4,943,616 | 6/1990 | Mishara | 525/264 |
| 4,946,899 | 8/1990 | Kennedy et al. | 525/244 |
| 5,219,948 | 6/1993 | Storey | 525/314 |

OTHER PUBLICATIONS

Kennedy, et al. J. Polym. Sci. Polym. Chem. Ed. vol. 18, 1539–46 (1980).

*Primary Examiner*—James J. Seidleck
*Assistant Examiner*—I. Zemel

[57] ABSTRACT

The present invention provides a process for the living polymerization of aromatic, preferably styrenic monomers initiated from a living polyolefin, particularly polyisobutylene, chain end and thereby provides an efficient method for the preparation of block copolymers having polyolefin mid-blocks and styrenic end blocks. Polyisobutylene mid blocks and styrenic end blocks comprising para-methylstyrene, alpha-methylstyrene, indene and the like are preferred.

32 Claims, No Drawings

LIVING POLYMERIZATION OF OLEFINS TO PRODUCE COPOLYMER

SUMMARY OF THE INVENTION

The present invention provides a process for the living polymerization of olefins, preferably styrenic monomers, initiated from a living polyisoolefin chain end, preferably a functionalized polyisobutylene chain end. This provides, among other things, an efficient method for the preparation of copolymers and block copolymers based on polyisoolefins and styrenic monomers. Preferred monomers include isobutylene, para-methyl styrene, alpha-methylstyrene, indene and the like.

BACKGROUND OF THE INVENTION

The living polymerization of olefins is a method utilized to control molecular weight and final product properties in polymers. The polymerizations are called living because the initiators grow only one chain per initiator molecule and the polymerization continues until monomer is exhausted rather than terminating when the chain reaches a certain length or the catalyst is exhausted Para-methylstyrene (pMeSt) has reportedly been polymerized in a living fashion by the organic esters/BC13 initiating system (R. Faust and J. P. Kennedy; Polymer Bulletin, 19, 29 (1988)). Living polymerization of para-methylstyrene is also claimed with a 2,4,4-trimethylpentychloride/titanium tetrachloride (TMPCl/TiCl4) initiating system in the presence of triethylamine (Et3N) although initiation is reportedly slow. Likewise, living polymerization has also been reportedly used to synthesize block copolymers. Y. Tsunogae and J. P. Kennedy reported the synthesis of para-methylstyrene—polyisobutylene—paramethylstyrene triblock copolymer with dicumylchloride/titanium tetrachloride/triethylamine/(DiCumCl/TiCl4/Et3N) in 40 parts by volume methylene chloride and 60 parts by volume n-hexane (MeCl/n-hexane) at −80 degrees C. system (Y. Tsunogae and J. P. Kennedy; Polymer Bulletin, 27, 631(1992)). The triblocks manifested low tensile strength (14.1 MPa) indicating poor blocking efficiency.

Recently is has been discovered that living homopolymerization of isobutylene or styrene and sequential block copolymerization of said monomers can be achieved by an organic ester, ether or chloride/TiCl4 or BC13 initiating systems in the presence of a proton trap di-tert-butyl pyridine (DTBP) leading to block copolymers with high efficiency (R. Faust, M. Gyor, H. C. Wang, "Living Carbocationic Process", U.S. patent application Ser. No. 07/730,363 filed Jul. 15, 1991). The above procedure has produced low blocking efficiency with para-methylstyrene.

BRIEF DESCRIPTION OF THE INVENTION

The present invention provides a process to produce block copolymers and new block copolymers therefrom. In general, the process comprises the living polymerization of styrenic monomers initiated from a living polymer chain end. Block copolymers having blocks of styrenic monomers and blocks of other polymers are produced. This invention also relates to a method for producing an initiator/functionalized polymer effective for polymerizing styrenic monomers by capping or functionalizing an olefin polymer with unsubstituted or substituted diphenyl alkenes disclosed in concurrently filed U.S. Ser. No. 08/137,684.

DESCRIPTION OF THE PREFERRED EMBODIMENTS

This invention relates in part to the discovery that capping a living polyolefin cation with a non-polymerizable olefin and thereafter reacting the capped polymer with cationically polymerizable monomer is a new and efficient method to produce block copolymers. Preferred living polyolefin cations are preferably polyisoolefin cations, even more preferably living polyisobutylene cations (PIB+). Preferred non-polymerizable olefins that are contacted with the living polyolefin cation are

- substituted or unsubstituted diphenyl alkenes,
- substituted or unsubstituted α-methoxystyrenes,
- substituted or unsubstituted trans-stilbenes,
- substituted or unsubstituted 1-isopropenyl-naphthalenes, and
- substituted or unsubstituted 2,4-dimethyl-α-methylstyrenes.

Mono or multi substitution on the aromatic ring may include methyl-, methoxy-, dimethyl-, amino-, trimethylsiloxy-, groups and the like at different ring positions. Preferred diphenyl alkylenes include substituted or unsubstituted diphenyl ethylenes, even more preferably unsubstituted or substituted 1,1-diphenylethylenes. When contacted with the living polyolefin cation, a carbocation is produced. This carbocation is then contacted with one or more cationically polymerizable monomers to form block copolymer. Preferred monomers include styrenic monomers, preferably an alkyl styrene, more preferably para-alkylstyrene (wherein the alkyl has from 1 to 40 carbon atoms), even more preferably para-methylstyrene.

Interestingly enough the 1,1-diphenyl alkene compounds do not polymerize due to stearic hindrance but form stable carbocations with the living polyolefin cation. Alternatively, in a preferred embodiment, after capping the polyolefin to produce a carbocation, when working with very reactive monomers, the Lewis acidity could be decreased to a desired level by adding different amounts of metal alkoxides, preferably titanium alkoxides such as $Ti[OCH(CH_3)_2]_4$, $Ti[O(CH_2)_3CH_3]_4$ or similar organotitanium compounds. The desired level depends on the reactivity of the monomer. By decreasing the Lewis acidity, side reactions are minimized, and the polymerization is better controlled leading to high blocking efficiency.

In a preferred embodiment the living polyolefin cation is any polyolefin with a terminal cationic group. Typically these polyolefins are those that are made by living polymerization methods known to those of ordinary skill in the art. These living polymers make good candidates for creating living carbocationic sites on the polymer chain specifically because of their living characteristic of being able to polymerize additional monomer, i.e. react, whenever monomer is present long after the initial "polymerization" is complete. For example, polymeric carbocation can be made by reacting a living polymer with monomers that do not homopolymerize for thermodynamic reasons to form a carbocation. Such a procedure is disclosed and claimed in concurrently filed copending application U.S. Ser. No. 08/137,684, entitled "CAPPING OF LIVING POLYMERS," herein incorporated by reference. In the copending application, polyolefin, preferably, polyisoolefin, polymultiolefin and poly(substituted or unsubstituted vinylidene aromatic compounds) more preferably polyisobutylene, is reacted with a substituted or unsubstituted compound such as diphenyl alkene (the alkene may contain from 1 to 40 carbon atoms) to create a polymer with a "cap" of the diphenyl alkene comprising a carbocation. Other compounds that can be used in place of the 1,1-diphenyl alkene are:

substituted or unsubstituted diphenyl alkenes;
substituted or unsubstituted α-methoxystyrenes;
substituted or unsubstituted trans-stilbenes;
substituted or unsubstituted 1-isopropenyl-napthalenes; and substituted or unsubstituted 2,4-dimethyl-α-methylstyrenes.

In the present invention, these "capped" polyolefins with the carbocationic site are then contacted with a cationicallly polymerizable monomer such as any styrenic monomer to form a "second" polymer block attached to the first polyolefin. By this method diblock (and multiblock) copolymers can be synthesized.

Preferred polyolefins include C4 to C18 polyisomonoolefins, C4 to C14 polymultiolefins, and poly(substituted or unsubstituted vinylene, vinyl or vinylidene aromatic compounds), preferably C4 to C10 polyisomonoolefins, even more preferably C4 to C8 polyisomonoolefins. Polyisobutylene is an example of preferred isoolefin polymer.

One set of reaction conditions that will produce these carbocations is, in a diluent, contact the olefin monomer with an initiating system comprising an initiator (usually an organic ether, organic ester, or organic halide) and a co-initiator of Lewis acid (TiCl4 is a preferred co-initiator) and a proton trap. Preferred proton traps include substituted or unsubstituted 2,6-di-tert-butylpyridines. The co-initiator is typically used in concentrations equal to or preferably 2 to 40 times higher than the concentration of the initiator. The concentration of proton trap is preferably slightly higher than the concentration of protic impurities in the polymerization system. Any hydrocarbons and halogenated versions thereof may be used as the diluent. Methyl chloride mixed with hexane is a preferred diluent composition. The polymerization is typically conducted in a temperature range of from about −10° to about −100° C., preferably from about −50° to about −90° C. for about 10 to about 120 minutes depending on the concentration of the initiator and the co-initiator. Once the desired living polymer is obtained, one or more substituted or unsubstituted di-phenylethylenes is added to the polymerization media in concentrations equal up to about 10 times the concentration of the living chain ends, preferably about 1 to about 5 times the concentration of the living chain ends, even more preferably about 1 to about 2 times the concentration of the living chain ends. The di-phenylethylene is allowed to react with the living polymer for about 10 minutes to about 5 hours, depending on the concentration of the concentration of the living chain ends and the diphenylethylene.

A preferred method for obtaining 100% capping is simply to wait. The time to wait will vary with the initiator, diphenylethylene an Lewis acid concentrations. With higher initiator concentrations the time is shorter, about 20 minutes, while lower initiator concentrations may require 10 hours to achieve 100% capping.

The "capped" polyolefin, i.e. containing a carbocation, may then be contacted with one or more styrenic monomers under polymerization conditions to produce block copolymers. The polymerization may take place in any suitable reaction vessel including but not limited to glassware, autoclave reactors, tubular reactors, continuous stirred tank reactors, and other reactors known in the art. The polymerization may be run for less than a minute to over 5 hours, however longer polymerization times may be utilized depending on the final product desired. Polymerization times to 10 reach near 100% conversion of the monomer to polymer depend on the initiator. However, for a typical commercial system polymerization times of less than 30 minutes are preferred. The reactions may also take place in solution phase, bulk phase and/or high pressure.

In another embodiment of the polymerization processes of this invention, both polymerizing monomer to make living polymer and using the capped living polymer as a initiator for the polymerization of styrenic monomer, may be conducted in a polymerization zone of a conventional polymerization apparatus, in the presence or in the absence of a diluent. Suitable polymerization conditions include a temperature ranging from about minus 100° C. to about plus 10° C., preferably from about minus 80° C. to about 0° C. for a time period ranging from about 1 to about 180 minutes (hours). Preferably, the polymerization reaction mixture may be subjected to agitation using conventional mixing means.

The particular blocks of the block co-polymers produced by the process of the present invention may be homopolymers, copolymers, terpolymers, and the like depending upon the olefinic chargestock used.

The number average molecular weight (Mn) of the block co-polymers of the present invention may range from about 500 to about 2,000,000, preferably from about 20,000 to about 300,000. The polymers have a narrow molecular weight distribution such that the ratio of weight average molecular weight to number average molecular weight (Mw/Mn) of the polymers ranges from about 1.0 to about 1.5, preferably from about 1.0 to about 1.2. The polymers may be recovered from the polymerization zone effluent and finished by conventional methods.

The process of the present invention may be conducted in the presence or in the absence of a diluent. Suitable diluents include C1 to C4 halogenated hydrocarbons, such as methyl chloride and methylene dichloride, C5 to C8 aliphatic hydrocarbons, such as pentane, hexane, and heptane and C5 to C10 cyclic hydrocarbons, such as cyclohexane and methyl cyclohexane, and mixtures thereof.

If solution phase is chosen, suitable diluents may be single or multi-component diluent systems that dissolve both polyisobutylene and the styrenic polymer typical diluent or solvent mixtures usually consist of a polar solvent like methyl chloride or methylene chloride and a nonpolar solvent such as hexane, cyclohexane or methylcyclohexane and the like. Polymerization temperatures may be from about −10 degrees C. to about −100 degrees C., preferably −50 degrees C. to −90 degrees C.

Preferred monomers include cationically polymerizable monomer, preferably any aromatic monomer, including any styrenic, naphthalenic or indeneyl monomer or derivatives or mixtures thereof. Preferred indenyl monomers include substituted or unsubstituted indene. Preferred naphthalenic monomers include napthalene, isopropenylnaphthalene and the like. Preferred styrenic monomers include alkyl styrenes, wherein the alkyl has 1 to 40 carbon atoms, preferably 1 to 20 carbon atoms. Another preferred species of monomer is ring substituted alkyl styrene, such as, para-alkylstyrene, wherein the alkyl has from 1 to 40 carbon atoms, preferably 1 to 10 carbon atoms. Specific examples of preferred monomers include alpha-methylstyrene, para-methylstyrene, indene, p-tert-butyl-styrene; p-methoxy styrene; stilbene, 2,4,6, trimethyl styrene, and the like.

In another embodiment the styrenic monomer may be combined with an olefin, such as isobutylene, butene, hexene, and the like, or any of the above listed monomers form a "co-polymer" block.

In prefered embodiments, the styrenic monomer is combined with the polyolefin carbocation at any mole ratio depending on the final product desired. For preferred elastomeric embodiments the styrenic monomer may be present at about 20 to about 50 weight %, while for thermoplastic applications the styrenic monomer is present at up to 15 weight %, whereas for impact modified applications the styrenic monomer may be present at 75 to 99 weight %.

The product polymers are preferably diblock and triblock copolymers. These block copolymers preferably contain end block(s) of styrenic polymer and mid block(s) of polyisoolefin. A particularly preferred embodiment is a triblock copolymer having a polyisobutylene mid-block and para-methylstyrene end-blocks. Likewise other polyolefin-styrenic co-polymer block combinations will occur to those of ordinary skill in the art having the benefit of this disclosure. Polyisobutylene-polystyrene diblock copolymers polyisopentene-polyalpha-methylstyrene diblock copolymers, polyethylene-polystyrene diblock copolymers. Ethylene-/propylene copolymer-polystyrene diblock copolymers and similar triblocks are just a few of the many possible variations.

A unique aspect of this invention is that the individual block sections of the copolymers have narrow molecular weight distribution. Thus, in preferred embodiments the molecular weight distribution can be controlled to produce a narrow unimodal distribution in each polymer block as well as one whole polymer.

The combination of narrow molecular weight PIB with narrow molecular weight para-methylstyrene produces an unusually strong and unusually flexible thermoplastic elastomer with higher end use temperatures and blocking efficiency.

EXAMPLES

In the examples that follow, molecular weight was measured by GPC method, using polyisobutylene standards. Blocking efficiency was predicted by measuring initiator efficiency. The proton trap was 2,6-di-tert-butyl-pryridine (DTBP).

Our strategy for the synthesis of PpMeSt-PIB-PpMeSt triblock was to cap the PIB chain end with 1,1-diphenylethylene (DPE), i.e.,

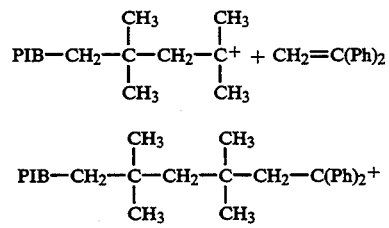

and initiate pMeSt from the stable diphenyl alkyl cation. Since the diphenyl alkyl cation is more stable than the p-methylstyryl cation the Lewis acidity can now be decreased to a desired level to control the rate of homopolymerization without decreasing the crossover rate. (crossover is the initiation from first monomer addition to the living PIB chain end, literally crossing over from isobutylene to p-methylstyrene, hence the term "crossover."

POLYMERIZATION EXPERIMENTS WITH pMeSt

In these experiments the blocking step was modeled using 2,4,4-trimethylpentyl chloride (TMPCl). The initiator efficiency that can be easily measured was used to predict blocking efficiency.

Example 1

TMPCl was reacted with 10% more DPE (1,1-diphenyl ethylene) than the stoichiometric amount at the polymerization conditions i.e., TiCl4/MeCl:MeCH 40v:60v −80° C., followed by the addition of para-methyl styrene (pMeSt). Close to 100% initiator efficiencies were obtained at high conversions (Table 1).

TABLE 1

| Polymerization Time, (min) | Conversion (%) | I eff (%) |
|---|---|---|
| 0.5 | 63 | 54 |
| 1 | 70 | 77 |
| 2 | 74 | 87 |
| 4 | 82 | 106 |
| 8 | 86 | 109 |
| 16 | 100 | 125 |

Example 2

In these experiments different amounts of Ti[OCH(CH3)2]4 were added before the addition of pMeSt, but after the DPE reaction. In these experiments close to 100% initiating efficiencies are obtained even at low conversions.

TABLE 2

| TiCl4/ Ti[OCH(CH3)2]4 | Time (min) | Conv (%) | $I_{eff}$ (%) |
|---|---|---|---|
| 7/1 | 2.5 | 78 | 105 |
|  | 4 | 83 | 118 |
|  | 32 | 100 | 130 |
| 3/1 | 8 | 11 | 137 |
|  | 16 | 16 | 117 |
|  | 66 | 19 | 123 |
| 3/2 | 2 | 3 | 118 |
|  | 8 | 5 | 118 |
|  | 16 | 6 | 100 |

Example 3

In this example Ti[O(CH2)3CH3]4 was used instead of Ti[OCH(CH3)2]4. Similarly to Example 2, close to 100% initiator efficiencies were obtained.

TABLE 3

| TiCl4/ Ti[O(CH2)3CH3]4 | Polym. Time (min) | Conv. (%) | I eff (%) |
|---|---|---|---|
| 13/3 | 1 | 62 | 92 |
|  | 4 | 78 | 114 |
|  | 32 | 100 | 134 |

In the following examples, hexanes were used instead of methylcyclohexane as hexanes are much less expensive.

Example 4

In these experiments TMPCl was reacted with 3% more DPE than the stoichiometric amount at the polymerization conditions i.e., TiCl4/MeCl:HX 40v:60v, −80° C., followed by the addition of pMeSt. Lower than 100% initiator efficiencies were obtained even at high conversions indicating slow crossover reaction.

Example 5

In these experiments different amounts of Ti-[OCH(CH3)2]4. or Ti[O(CH2)3CH3]4 was added before the addition of pMeSt. Close to 100% initiating efficiencies were obtained.

TABLE 4

|  | Polym. Time (min) | Conv.- (%) | I eff (%) |
|---|---|---|---|
| TiCl4/ Ti[OCH(CH3)2]4 |  |  |  |
| 3/1 | 10 | 30 | 132 |
|  | 40 | 48 | 119 |
|  | 320 | 70 | 102 |
| 25/7 | 10 | 98 | 102 |
|  | 20 | 100 | 104 |
| TiCl4/ Ti[O(CH2)3CH3]4 |  |  |  |
| 3/1 | 5 | 98 | 93 |
|  | 21 | 99 | 100 |

Example 6

PIB-PpMeSt diblock copolymers were prepared in this example using DPE and Ti(IpO)4 and were compared with results obtained in the absence of DPE and Ti(IPO)4 n-Hexane/methylchloride (HX/MeCl) mixtures were used in 60/40 v/v ratio at −80° C. The [TiCl4]:[Ti(IpO)4] ratio was 25:7. 2,6-di-tert-butylpyrine (DTBP) was used as proton trap. Concentrations during the IB polymerization were: [TiCl4]=0.0364M, [DTBP]=0.004M, [TMPCl]=0.002M, [IB]o=0.354M polymerization time 20 min, V total=25 mL. [DPE]=1.03[TMPCl](added in 1.5 ml solvent), reaction time 30 min. Ti(IpO)4 was added in 2.48 ml MeCH [TiCl4]:[Ti(IpO)4]=25:7, reaction time 10 min. 4.237×10−3 mol pMeSt was used; its volume with the solvent mixture was 2.15 mL.

Control polymerization without DPE capping: first IB was polymerized using TMPCl initiator followed by the addition of the pMeSt solution. Experiments with DPE capping: first IB was polymerized using TMPCl followed by the addition of DPE, Ti(IpO)4 and the pMeSt solution.

The GPC traces of the control experiments (without DPE capping) are bimodal indicating large amount of unreacted PIB (estimated blocking efficiency of approximately 60%). In contrast the GPC traces of the products obtained by our novel strategy with DPE capping and by the use of Ti(IpO)4 demonstrate complete blocking.

Similar results have been obtained with the methylcyclohexane/methylchloride (MeCH/MeCl) 60/40, v/v solvent mixture.

Example 7

The preparation of PpMeSt-PIB-PpMeSt linear and triarm-star triblock copolymers.

Tert-butyl-dicumylchloride (t-BudiCUCl) and tricumylchloride (TriCUCl) were used as initiators. The concentration of the functional groups was 0.002M with both initiators. MeCl/HX:40/60:v/v solvent mixture and −80° C. were used. IB (isobutylene) was added in three increments. During its polymerization the concentration of the TiCl4 was 0.036M.

At the end of the IB polymerization, DPE (diphenyl ethylene) was added and reacted for approximately one hour. It was followed by the addition of more TiCl4 and the introduction of Ti(IpO)4 to reach a 3:1 ratio. The system was diluted with MeCl and HX before the pMeSt addition when high molecular weight and increased viscosity were anticipated. The pMeSt was added in MeCl/HX:40/60 solution (1 ml of pMeST solution contained 0.001906 mol of pMeSt) in one or several increments. The proton trap (DTBP) concentration was 0.004M. To maintain the DTBP concentration the pMeSt solution also contained DTBP. Other conditions are reported in table 7.

In each line the top number is the amount or concentration of the reactants at −80° C. and the bottom line is the reaction time in minutes. [TiCl4] was 0.0364M during the PIB preparation and during the reaction of DPE and it was as indicated in the table during the pMeSt polymerization.

TABLE 7

| No. | IB (ml) t (min) | DPE % t (min) | [TiCl4] (M) | P sol (ml) t (min) |
|---|---|---|---|---|
| 043093-1 | 17.4 + 17.4 + 5 | 3.87 | 0.0556 | 84.5 |
|  | 15 + 10 + 55 | 68 |  | 128 |
| 043093-2 | 17.4 + 17.4 + 5 | 17.8 | 0.0563 | 84.5 |
|  | 15 + 10 + 60 | 67 |  | 128 |
| 050793-1 | 17.4 + 17.4 + 5 | 29.4 | 0.0567 | 84.5 |
|  | 15 + 10 + 68 | 68 |  | 305 |
| 050793-2 | 17.4 + 17.4 + 5 | 32.9 | 0.0563 | 84.5 |
|  | 15 + 12 + 68 | 65 |  | 305 |
| 051493-1 | 17.4 + 17.4 + 5 | 197 | 0.0368 | 169 |
|  | 15 + 10 + 65 | 60 |  | 1100 |
| 051493-2 | 17.4 + 17.4 + 5 | 99.2 | 0.0367 | 169 |
|  | 15 + 15 + 60 | 60 |  | 1100 |
| 051893-1 | 17.4 + 17.4 + 5 | 99.5 | 0.0521 | 105 |
|  | 15 + 10 + 60 | 83 |  | 408 |
| 051893-2 | 17.4 + 17.4 + 5 | 200 | 0.0521 | 105 |
|  | 15 + 10 + 60 | 79 |  | 409 |
| 052193-1 | 17.4 + 17.4 + 5 | 100 | 0.0465– | 5 × 28 + 29 |
|  | 15 + 10 + 60 | 65 | 0.0382 | 5 × 20 + 749 |
| 052193-2 | 17.4 + 17.4 + 5 | 100 | 0.0618– | 5 × 28 + 29 |
|  | 15 + 10 + 60 | 77 | 0.0512 | 5 × 20 + 780 |
| 052593-1 | 17.4 + 17.4 + 5 | 104 | 0.0818– | 5 × 27 + 18 |
|  | 15 + 10 + 80 | 65 | 0.0633 | 4 × 34 + 781 |
| 052593-2 | 17.4 + 17.4 + 5 | 98.9 | 0.121– | 5 × 26 + 16 |
|  | 15 + 10 + 70 | 65 | 0.0928 | 4 × 34 + 750 |
| 052893-1 | 11.2 + 11.2 + 3.2 | 97.8 | 0.0989– | 7 × 15 |
|  | 15 + 10 + 80 | 65 | 0.0832 | 6 × 20 + 905 |
| 052893-2 | 11.2 + 11.2 + 3.2 | 49.2 | 0.0969– | 7 × 15 |
|  | 15 + 11 + 80 | 65 | 0.0817 | 6 × 20 + 905 |

P sol (ml) = milliliters of pMeSt solution.
The stress strain properties of the above polymers are reported in table 8. Modulus, tensile strength and elongation at break were measured according to ASTM D 412.

TABLE 8

| Sample | 100% Modulus (psi) | 200% Modulus (psi) | 300% Modulus (psi) | 400% Modulus (psi) | 500% Modulus (psi) | Tensile Strength (psi) | Elongation at Break (%) |
|---|---|---|---|---|---|---|---|
| 043093-1 | 370 | 574 | — | — | — | 648.3 | 221.2 |
| 043093-2 | 246 | 522 | 938 | — | — | 1557 | 438 |

TABLE 8-continued

| Sample | 100% Modulus (psi) | 200% Modulus (psi) | 300% Modulus (psi) | 400% Modulus (psi) | 500% Modulus (psi) | Tensile Strength (psi) | Elongation at Break (%) |
|---|---|---|---|---|---|---|---|
| 050793-1 | 452 | 699 | 1087 | 1549 | — | 1752 | 452 |
| 050793-2 | 204 | 293 | 476 | 794 | 1267 | 2171 | 654.3 |
| 051493-1 | 371 | 636 | 1121 | 1746 | — | 2323 | 473 |
| 051493-2 | 2168 | 2182 | — | — | — | 2626 | 285 |
| 051893-1 | 700 | 1071 | 1616 | — | — | 2071 | 384.1 |
| 051893-2 | 912 | 1311 | 1884 | 2453 | — | 2792 | 470 |
| 052193-1 | 753 | 1203 | 1858 | 2525 | — | 3043 | 482 |
| 052193-2 | 1231 | 1592 | 2220 | 2885 | — | 3123 | 437 |
| 052893-1 | 1706 | 1836 | 2243 | — | — | 2495 | 339 |
| 052893-2 | 1794 | 1908 | 2438 | — | — | 2348 | 252 |
| 052593-1 | 1771 | 2022 | 2551 | — | — | 2902 | 365 |
| 052593-2 | 1659 | 2082 | 2668 | 3212 | — | 3238 | 400 |

Following the reaction of the DPE, 1.0 or 2.0 ml samples were taken from the reaction flask to estimate the conversion of IB to PIB and to measure the molecular weight of the PIB middle segment. The conversion of IB was generally 100%. The PIB molecular weights and molecular weight distributions (MWD's) were calculated using PIB calibration. The triblock molecular weights and MWD's were obtained using a Gel Permeation Chromotography on line Multiangle LASER Light Scattering Detector. The Molecular weights, MWD's and the pMeSt conversions are in table 9. The compositions of the triblocks, reported in table 10, were calculated from the conversion and from proton NMR measurements. When the DPE was used in small excess, the MWD curves showed a broadening on the high molecular weight side. With large excesses the MWD was narrower.

TABLE 9

| No. | PIB Mn/1000 | PIB Mw/Mn | Triblock Mn/1000 | Triblock Mw/Mn | conv. pMeSt |
|---|---|---|---|---|---|
| 043093-1 | 101.6 | 1.09 | 185.2 | 1.69 | 100 |
| 043093-2 | 101.5 | 1.08 | 187.4 | 1.86 | 100 |
| 050793-1 | 101.7 | 1.13 | 191.7 | 1.13 | 95.1 |
| 050793-2 | 105.1 | 1.11 | 169.1 | 1.13 | 61.3 |
| 051493-1 | 127.3 | 1.09 | 235.1 | 1.08 | 40.6 |
| 051493-2 | 126.3 | 1.09 | 336.6 | 1.20 | 100 |
| 051893-1 | 99.2 | 1.10 | 190.1 | 1.12 | 85.0 |
| 051893-2 | 100.3 | 1.10 | 211.6 | 1.23 | 100 |
| 052193-1 | 148.9 | 1.10 | 257.0 | 1.12 | 55.4 |
| 052193-2 | 127.3 | 1.07 | 293.7 | 1.11 | 70.3 |
| 052593-1 | 100.0 | 1.09 | 237.1 | 1.23 | 100 |
| 052593-2 | 101.1 | 1.07 | 233.5 | 1.26 | 100 |
| 052893-1 | 128.3 | 1.07 | 336.9 | 1.36 | 100 |
| 052893-2 | 126.5 | 1.08 | 352.9 | 1.44 | 100 |

TABLE 10

| No. | pMeSt content (NMR) mol % | pMeSt content (NMR) Wt. % | pMeSt content (Calc) mol % | pMeSt content (Calc) Wt. % |
|---|---|---|---|---|
| 043093-1 | 30.8 | 48.4 | 24.0 | 39.0 |
| 043093-2 | 25.2 | 41.5 | 24.2 | 40.2 |
| 050793-1 | 23.2 | 38.8 | 22.9 | 38.5 |
| 050793-2 | 17.3 | 30.6 | 16.1 | 28.8 |
| 051493-1 | 23.4 | 39.1 | 20.5 | 35.1 |
| 051493-2 | 44.4 | 62.8 | 38.9 | 57.3 |
| 051893-1 | 30.9 | 48.5 | 25.0 | 41.2 |
| 051893-2 | 30.8 | 48.4 | 28.1 | 45.1 |
| 052193-1 | 26.7 | 43.5 | 25.7 | 42.1 |
| 052193-2 | 33.5 | 51.5 | 30.5 | 48.1 |
| 052593-1 | 35.3 | 53.4 | 36.1 | 54.4 |
| 502593-2 | 35.3 | 53.5 | 35.4 | 53.5 |
| 052893-1 | 39.1 | 57.5 | 37.5 | 56.1 |
| 952893-2 | 23.1 | 38.8 | 37.7 | 56.1 |

TABLE 11

| No. | Size of the PpMeSt segements |
|---|---|
| 043093-1 | 2 × 41,800 |
| 043093-2 | 2 × 42,900 |
| 050793-1 | 2 × 45,000 |
| 050793-2 | 2 × 30,000 |
| 051493-1 | 3 × 37,300 |
| 051493-2 | 3 × 70,100 |
| 051893-1 | 2 × 45,500 |
| 051893-2 | 2 × 55,700 |
| 052193-1 | 3 × 44,000 |
| 052193-2 | 3 × 55,500 |
| 052593-1 | 2 × 68,600 |
| 502593-2 | 2 × 66,200 |
| 052893-1 | 3 × 69,500 |
| 952893-2 | 3 × 75,500 |

As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A method for producing a block copolymer comprising:
   (a) contacting under reaction conditions a living polymer cation with an olefin capping agent which does not homopolymerize under said reaction conditions to form an end-capped living polymer carbocation; and
   (b) contacting said end-capped living polymer carbocation under cationic polymerization conditions with one or more cationically polymerizable monomers to produce a block copolymer containing polymer segments of said cationically polymerizable monomer.

2. The method of claim 1 wherein said capping agent is selected from the group consisting of a diphenylalkene, an α-methoxystyrene, a trans-stilbene, a 1-isopropenylnaphthalene, a 2,4-dimethyl-α-methylstyrene and ring substituted derivatives thereof.

3. The method of claim 2 wherein said capping agent is a diphenyl alkene.

4. The method of claim 3 wherein said capping agent is a diphenyl ethylene.

5. The method of claim 4 wherein said capping agent is 1,1-diphenylethylene.

6. The method of claim 1 wherein said cationically polymerizable monomer is a vinyl aromatic monomer.

7. The method of claim 6 wherein said vinyl aromatic monomer is selected from the group consisting of styrenic, napthalenic and indenyl monomers.

8. The method of claim 7 wherein said vinyl aromatic monomer is an alkyl styrene wherein the alkyl group contains 1 to 40 carbon atoms.

9. The method of claim 8 wherein said vinyl aromatic monomer is para-methylstyrene.

10. The method of claim 2 wherein said ring substituted derivatives are selected from the group consisting of methyl, methoxy, dimethyl, amino and trimethylsiloxy groups.

11. The method of claim 1 wherein said living polymer cation comprises a cation of an olefin polymer.

12. The method of claim 11 wherein said olefin polymer is selected from the group consisting of $C_4$ to $C_{18}$ polyisomonoolefins, $C_4$ to $C_{14}$ polymultiolefins, vinyl polymers and vinylidene polymers.

13. The method of claim 11 wherein said olefin polymer is a $C_4$ to $C_8$ polyisomonoolefin.

14. The method of claim 13 wherein said olefin polymer is polyisobutylene.

15. The method of claim 1 wherein said capping agent is added to said living polymer cation at a concentration equal to up to about 10 times the concentration of said living polymer cation ends.

16. The method of claim 15 wherein said concentration is from about 1 to 2 times the concentration of said living polymer cation ends.

17. The method of claim 1 wherein said living polymer cation produced in step (a) is produced by contacting a cationically polymerizable monomer with an initiator system comprising a mixture of an organic ether, organic ester or organic halide and a Lewis acid.

18. The method of claim 1 wherein said cationic polymerization conditions of step (b) include a temperature in range of minus 100° C. to plus 10° C.

19. A block copolymer prepared by the process of claim 1.

20. A method for producing a block copolymer comprising a polyisobutylene polymer segment and a segment of polymerized styrenic monomer comprising:

(a) contacting a living polyisobutylene cation under reaction conditions with a diphenyl alkene capping agent to form an end-capped living polyisobutylene carbocation; and (b) contacting said carbocation with a styrenic monomer under cationic polymerization conditions to form said block copolymer.

21. The method of claim 20 wherein said diphenyl alkene capping agent is 1,1-diphenylethylene.

22. The method of claim 21 wherein said styrenic monomer is para-methylstyrene.

23. The block copolymer of claim 19 comprising a polymer chain segment of an olefin polymer and a polymer chain segment of a polymerized vinyl aromatic monomer.

24. The block copolymer of claim 23 wherein said olefin polymer is an isoolefin polymer.

25. The block copolymer of claim 24 wherein said isoolefin polymer is polyisobutylene.

26. The block copolymer of claim 23 wherein said polymerized vinyl aromatic monomer is a styrenic monomer.

27. The block copolymer of claim 26 wherein said styrenic monomer is para-methylstyrene.

28. The block copolymer of claim 23 comprising a mid-block of said olefin polymer and end-blocks of said polymerized vinyl aromatic monomer.

29. The block copolymer of claim 28 wherein said olefin polymer is polyisobutylene and said vinyl aromatic monomer is paramethylstyrene.

30. The block copolymer of claim 23 having a number average molecular weight of up to 2,000,000 and a molecular weight distribution (Mw/Mn) of from about 1.0 to about 1.5.

31. The block copolymer of claim 19 wherein said capping agent is a diphenyl alkene.

32. The block copolymer of claim 31 wherein said capping agent is a diphenyl ethylene.

* * * * *